US012609029B2

(12) United States Patent
Mesery et al.

(10) Patent No.: US 12,609,029 B2
(45) Date of Patent: Apr. 21, 2026

(54) PARKING SPOT DETECTION

(71) Applicant: IMAGRY ISRAEL LTD., Haifa (IL)

(72) Inventors: Itai Mesery, Yokneam Ilit (IL); Khaled Fahoum, Acre (IL); Ilan Shaviv, Shimshit (IL)

(73) Assignee: IMAGRY ISTAEL LTD., Haifa (IL)

( * ) Notice: Subject to any disclaimer, the term of this patent is extended or adjusted under 35 U.S.C. 154(b) by 240 days.

(21) Appl. No.: 18/609,536

(22) Filed: Mar. 19, 2024

(65) Prior Publication Data

US 2025/0299579 A1 Sep. 25, 2025

(51) Int. Cl.
G08G 1/14 (2006.01)
B60W 30/06 (2006.01)
G06N 3/04 (2023.01)

(52) U.S. Cl.
CPC ............. G08G 1/143 (2013.01); B60W 30/06 (2013.01); G06N 3/04 (2013.01); G08G 1/146 (2013.01); B60W 2556/40 (2020.02)

(58) Field of Classification Search
CPC ....... G08G 1/143; G08G 1/146; B60W 30/06; B60W 2556/40; G06N 3/04
See application file for complete search history.

(56) References Cited

U.S. PATENT DOCUMENTS

2018/0232583 A1* 8/2018 Wang .................... G06V 10/82
2021/0039675 A1 2/2021 Lee et al.
2023/0331215 A1 10/2023 Farag et al.
2025/0224246 A1* 7/2025 Xiao ................. G01C 21/3685

OTHER PUBLICATIONS

ISR and WO for PCT/IL2025/050102 (Mar. 27, 2025).

* cited by examiner

*Primary Examiner* — Daryl C Pope

(57) ABSTRACT

A method, a computerized apparatus and a computer program product for parking slot detection. The method comprises obtaining an elevated perception map of a surrounding area around a vehicle. Each pixel in the elevated perception map is associated with a predetermined relative location to the vehicle. The elevated perception map comprises a plurality of functional layers. Values of pixels at different layers indicate an infrastructure segment or object located at corresponding relative locations to the vehicle. The method further comprises performing parking slot object detection in the elevated perception map. The parking slot object detection is performed using an Artificial Neural Network (ANN) to obtain one or more detected parking slot objects. The one or more detected parking slot objects are provided to autonomous driving systems and utilized to autonomously park vehicles in vacant parking slots that are selected therefrom.

14 Claims, 3 Drawing Sheets

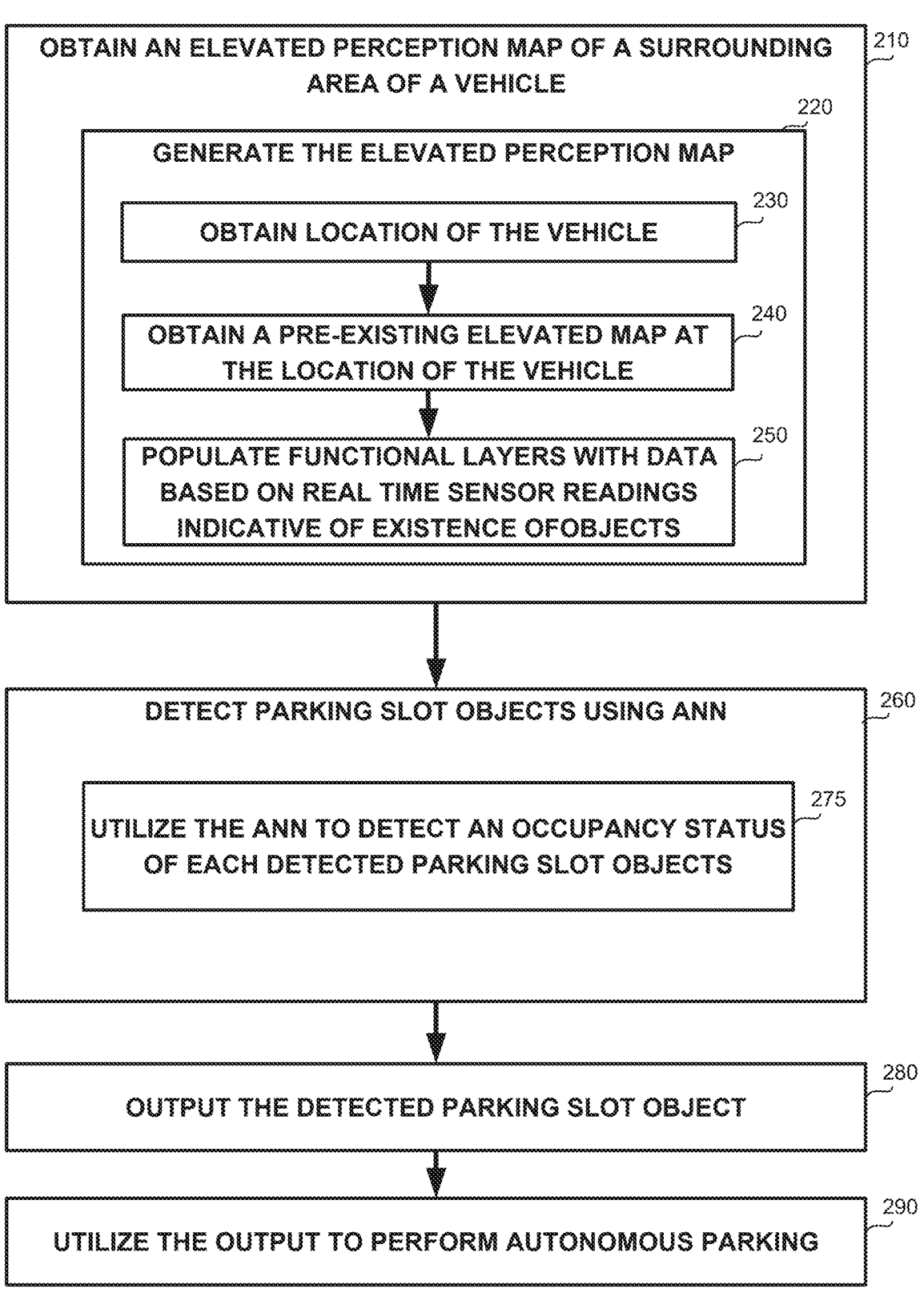

OBTAIN AN ELEVATED PERCEPTION MAP OF A SURROUNDING AREA OF A VEHICLE — 210

GENERATE THE ELEVATED PERCEPTION MAP — 220

OBTAIN LOCATION OF THE VEHICLE — 230

OBTAIN A PRE-EXISTING ELEVATED MAP AT THE LOCATION OF THE VEHICLE — 240

POPULATE FUNCTIONAL LAYERS WITH DATA BASED ON REAL TIME SENSOR READINGS INDICATIVE OF EXISTENCE OFOBJECTS — 250

DETECT PARKING SLOT OBJECTS USING ANN — 260

UTILIZE THE ANN TO DETECT AN OCCUPANCY STATUS OF EACH DETECTED PARKING SLOT OBJECTS — 275

OUTPUT THE DETECTED PARKING SLOT OBJECT — 280

UTILIZE THE OUTPUT TO PERFORM AUTONOMOUS PARKING — 290

FIG. 2

PARKING SPOT DETECTION

TECHNICAL FIELD

The present disclosure relates to parking spot detection in general, and to parking spot detection using perception maps, in particular.

BACKGROUND

As urbanization continues to accelerate, there's a growing need for effective parking solutions to address the challenges posed by limited parking availability in urban areas. Traditional parking experiences often entail frustrating and time-consuming searches for available parking spaces, exacerbating congestion and environmental concerns. Existing parking systems, reliant on manual methods or basic sensor technologies, often yield inaccurate information regarding parking space availability. This inefficiency underscores the potential for improvement through the integration of advanced computer vision techniques for parking slot detection.

Computer vision, an interdisciplinary field, focuses on empowering machines to interpret and comprehend visual data. It encompasses the development of algorithms and methodologies to analyze, process, and extract meaningful insights from images or video streams. In the domain of parking slot detection, computer vision algorithms offer the capability to discern between vacant and occupied parking spaces, facilitate real-time monitoring of parking occupancy, and deliver timely updates to users, thereby enhancing overall parking management efficiency.

BRIEF SUMMARY

One exemplary embodiment of the disclosed subject matter is a method for parking slot detection, the method comprising: obtaining an elevated perception map of a surrounding area around a vehicle, each pixel in the elevated perception map is associated with a predetermined relative location to the vehicle, wherein the elevated perception map comprises a plurality of functional layers, wherein values of pixels at different layers indicate an infrastructure segment or object located at corresponding relative locations to the vehicle; performing parking slot object detection in the elevated perception map, wherein the parking slot object detection is performed using an Artificial Neural Network (ANN), whereby obtaining one or more detected parking slot objects; and outputting the one or more detected parking slot objects.

Optionally, said outputting comprises providing the one or more detected parking slot objects to an autonomous driving system of the vehicle, whereby the autonomous driving system is enabled to autonomously park the vehicle in a vacant parking slot that is selected from the one or more detected parking slot objects.

Optionally, the elevated perception map is at least one of: a top-down view of the surrounding area around the vehicle, and a bird's-eye view having a perspective view of the surrounding area around the vehicle.

Optionally, the plurality of functional layers of the elevated perception map comprises a parking area segmentation layer that is indicative of sub-areas in the surrounding area around the vehicle in which vehicles can park, whereby the parking slot object detection is configured to determine locations of one or more parking slot objects within areas that are segmented as parking areas according to the parking area segmentation layer.

Optionally, a parking blob indicated in the parking area segmentation layer is subdivided into a plurality of parking slots.

Optionally, the plurality of functional layers of the elevated perception map comprises a vehicle object layer that is indicative of other vehicles that are present in the surrounding area of the vehicle, whereby the parking slot object detection is configured to classify parking slots as occupied or vacant based on the other vehicles.

Optionally, the vehicle object layer is determined based on real-time sensor readings at the surrounding area of the vehicle.

Optionally, the vehicle object layer is determined based on filtration of vehicles that travel at a speed above a predetermined threshold speed.

Optionally, the plurality of functional layers of the elevated perception map comprises: at least one segmentation layer and at least one object layer, wherein an individual segmentation layer of the at least one segmentation layer represents an infrastructure segment, whereby a value of the individual segmentation layer at a pixel is indicative of whether a respective corresponding location to the pixel is associated with the infrastructure segment, wherein an individual object layer of the at least one object layer represents an object type, whereby a value of the individual object layer at the pixel is indicative of whether the respective corresponding location to the pixel is occupied by an object of the object type.

Optionally, values of pixels at different layers of the plurality of functional layers of the elevated perception map are indicative of infrastructure segments selected from the group of: a drivable road; an available driving path; a stop line indication; a parking area; and a lane markings indication.

Optionally, values of pixels at different layers of the plurality of functional layers of the elevated perception map are indicative of objects selected from the group of: a vehicle; a pedestrian; a sign; a speed bump indication; and a static obstacle.

Optionally, the elevated perception map is generated dynamically based on real-time data obtained from one or more sensors that are mounted on the vehicle.

Optionally, the elevated perception map is generated by: obtaining location of the vehicle; obtained a pre-existing elevated perception map at the location of the vehicle, the pre-existing elevated perception maps represents one or more static infrastructure segments at the location of the vehicle; and populating one or more functional layers with data based on real-time sensor reading that is indicative of existence of objects.

Optionally, the ANN is further configured to detect an occupancy status of each detected parking slot object, wherein the plurality of parking slot objects comprises at least two parking objects, having different occupancy statuses selected from the group of: a vacant parking slot status, a blocked parking slot status, and an occupied parking status.

Optionally, the model is trained to identify a first object type and a second object type, the first object type is a single parking slot object, the second object type is an object representing a sequence of one or more parking slots.

Another exemplary embodiment of the disclosed subject matter is a computerized apparatus having a hardware processor, the processor the hardware processor being coupled to a memory, being hardware processor adapted to perform the steps of: obtaining an elevated perception map of a surrounding area around a vehicle, each pixel in the elevated perception map is associated with a predetermined relative location to the vehicle, wherein the elevated perception map comprises a plurality of functional layers, wherein values of pixels at different layers indicate an infrastructure segment or object located at corresponding relative locations to the vehicle; performing parking slot object detection in the elevated perception map, wherein the parking slot object detection is performed using an Artificial Neural Network (ANN), whereby obtaining one or more detected parking slot objects; and outputting the one or more detected parking slot objects.

Yet another exemplary embodiment of the disclosed subject matter is a computer program product comprising a non-transitory computer readable storage medium retaining program instructions, which program instructions when read by a processor, cause the processor to perform a method comprising: obtaining an elevated perception map of a surrounding area around a vehicle, each pixel in the elevated perception map is associated with a predetermined relative location to the vehicle, wherein the elevated perception map comprises a plurality of functional layers, wherein values of pixels at different layers indicate an infrastructure segment or object located at corresponding relative locations to the vehicle; performing parking slot object detection in the elevated perception map, wherein the parking slot object detection is performed using an Artificial Neural Network (ANN), whereby obtaining one or more detected parking slot objects; and outputting the one or more detected parking slot objects.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 2 shows a flowchart diagram of a method, in accordance with some exemplary embodiments of the disclosed subject matter.

DETAILED DESCRIPTION

Figures 1A, 1B, 1C, 1D, 1E, 1F:
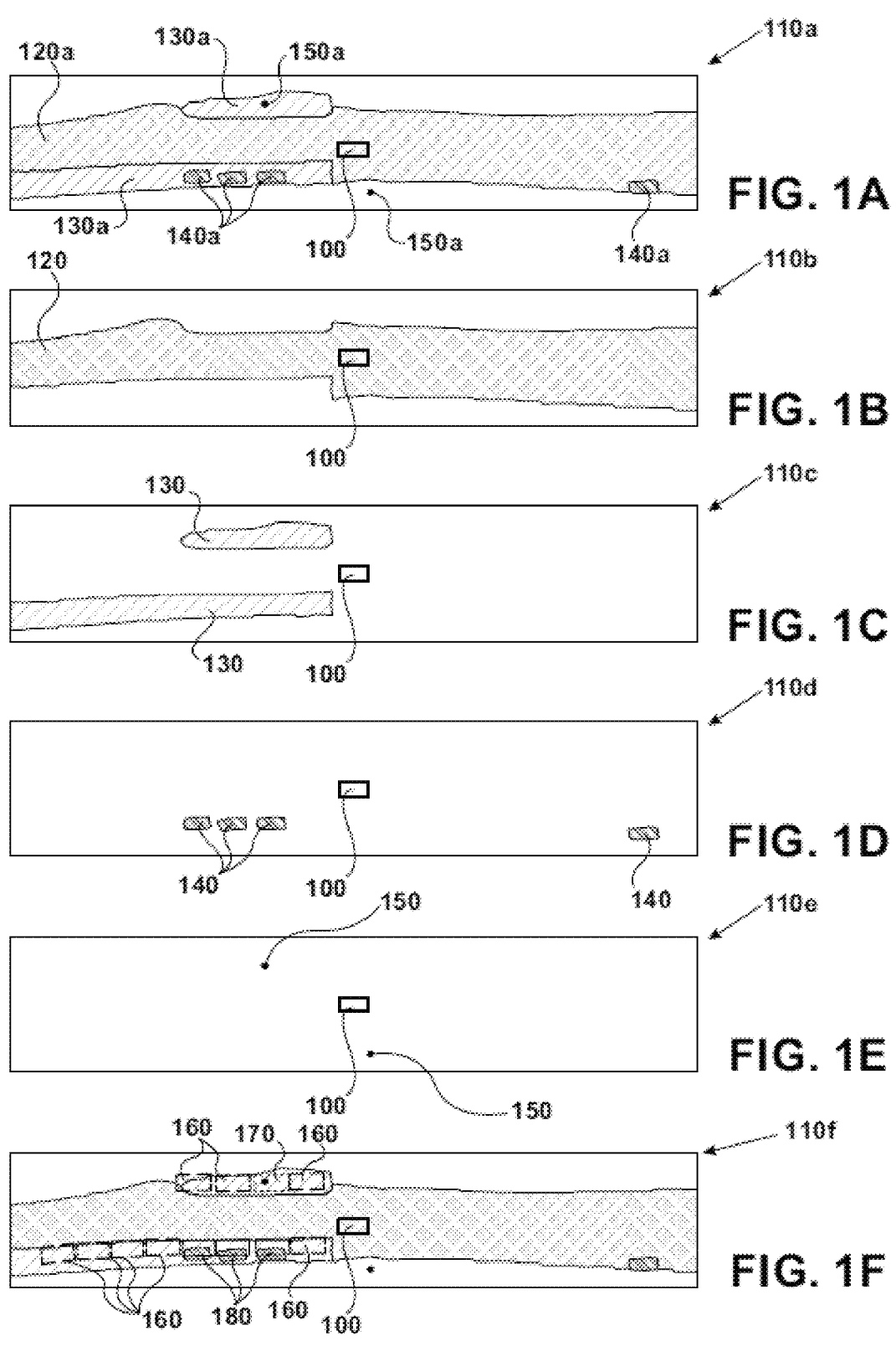
FIG. 1A shows a schematic illustration of an exemplary elevated perception map of a surrounding area around a vehicle, in accordance with some exemplary embodiments of the disclosed subject matter.
FIGS. 1B-1E show schematic illustrations of exemplary layers of elevated perception map of a surrounding area around a vehicle, in accordance with some exemplary embodiments of the disclosed subject matter.
FIG. 1F shows a schematic illustration of an exemplary elevated perception map of a surrounding area around a vehicle and markings of detected parking slot objects thereon, in accordance with some exemplary embodiments of the disclosed subject matter.

One technical problem dealt with by the disclosed subject matter is to improve identification and localization of valid parking spots in the vicinity of a vehicle, particularly during autonomous driving. In some exemplary embodiments, parking slots may exhibit diverse designs, including parallel, perpendicular, tilted spaces, or hybrid layouts within the same parking area. Adapting to such varied configurations may pose a significant challenge for detection systems. Additionally, or alternatively, different environmental conditions, such as varying lighting, adverse weather (such as rain, snow, fog, or the like), different times of the day, or the like, may impact the reliable identification of available parking slots. Ensuring robustness and reliability under such diverse environmental factors may be a critical objective of the disclosed subject matter.

Another technical problem dealt with by the disclosed subject matter is to enable the identification and localization of parking slots without reliance on pre-defined on-surface markings, such as road markings outlining parking boundaries. Some automatic parking slot detection techniques may depend on detecting these markings, which may include painted lines or symbols on the road. While such markings guide vehicles within defined boundaries, their reliance limits adaptability to diverse environments, especially when markings are not clearly visible. It may be required to overcome the challenges associated with conventional techniques by offering adaptability to various environments, even when standard markings are absent or unclear.

Yet another technical problem dealt with by the disclosed subject matter is the facilitation of automatic parking within unstructured parking areas. Parking spaces may not always be clearly defined or structured, especially in open spaces or unconventional parking scenarios. Automatic parking techniques face challenges in unstructured parking areas due to several reasons, such as lack of clear boundaries, variability in parking layout, existing of obstacles and irregularities, unexpected environmental conditions, or the like. Unstructured parking areas may lack clearly defined boundaries for individual parking spaces. Without clear markings or delineations, it may become difficult for both automatic parking systems to identify and navigate to available parking spots and to human drivers to select appropriate parking locations that provide efficient space utilization of the parking area.

One technical solution is to identify parking slot objects using elevated perception maps and ANN-based object detector. In some exemplary embodiments, an elevated perception map may be utilized to represent the surrounding area around the vehicle. The elevated perception map may comprise multiple functional layers. Each pixel in the elevated perception map may be associated with a predetermined relative location to the vehicle. The elevated perception map may comprise a plurality of functional layers. The values of pixels at different layers may indicate infrastructure segments or objects located at corresponding relative locations to the vehicle, such as driving paths infrastructure layers, parking area segmentation layer, vehicle object layer, pedestrian layers, or the like. These layers aid in identifying parking areas and classifying parking slots based on the presence of other vehicles or objects or availability of parking areas in the surrounding area.

It may be noted that the disclosed subject matter is exemplified using elevated perception maps. However, the disclosed subject matter is not limited to such types of maps or images of the surroundings (complete or partial) of the vehicle. In some exemplary embodiments, the elevated perception map may be a top-down view of the surrounding area around the vehicle, a bird's-eye view having a perspective view of the surrounding area around the vehicle, or the like. For the avoidance of doubt, it is noted that the elevated perception map may comprise any alternative elevated view of the surrounding areas of the vehicle, from any perspective, any position above the vehicle, facing forward, or the like. For simplicity, and without limiting the scope of the disclosed subject matter, the description focuses on the top-down representation embodiment.

In some exemplary embodiments, an ANN may be utilized to detect parking slot objects within the elevated perception maps. The ANN may be designed as a deep neural network, CNNS, consisting of multiple layers of interconnected neurons, or the like. It may be noted that parking slot objects may be regarded or considered as physical objects for the purpose of visual detection in this context techniques, despite not having physical features. The outputted detected parking slot objects may be utilized in various ways, such as by autonomous driving system of the vehicle, enabling autonomous parking, or the like.

In some exemplary embodiments, The ANN may be trained to detect parking slot objects within the parking area segmentation layer, which is indicative of sub-areas in the surrounding area around the vehicle in which vehicles can park. Such sub-areas may comprise parking blobs that can be subdivided into a plurality of parking slots. The ANN may be configured to determine locations of parking slot objects within areas that are segmented as parking areas according to the parking area segmentation layer.

Additionally, or alternatively, the ANN may be trained to detect an occupancy status of each detected parking slot object. The occupancy statuses may be vacant parking slot status, blocked parking slot status, occupied parking status, or the like. The occupancy status of the parking slot object may be determined based on the status of other objects in other layers of the elevated perception map. As an example, the plurality of functional layers of the elevated perception map may comprise a vehicle object layer that is indicative of other vehicles that are present in the surrounding area of the vehicle. The parking slot objects occupancy status may be classified as occupied or vacant based on the other vehicles identified based on the vehicle object layer. As an example, the plurality of functional layers of the elevated perception map may comprise an obstacle object layer that is indicative of obstacles in the surrounding area of the vehicle. The parking slot objects occupancy status may be classified as blocked based on obstacles identified based on the obstacle object layer.

In some exemplary embodiments, the output of the ANN, consisting of detected parking spots and their occupancy status, may be integrated back into the elevated perception maps. This information may be utilized by autonomous driving systems or parking assistance systems to enable autonomous parking or assist drivers in finding available parking spaces.

In some exemplary embodiments, the ANN may be trained to identify first object type representing a sequence of one or more parking slots, and a second object type representing a single parking slot object. In some cases, objects from the first object type which represents a consecutive sequence of one or more parking slots within the parking area, may be a grouping of parking slots that are adjacent to each other or arranged in a specific pattern. The ANN may be trained to identify and delineate these sequences, enabling it to understand the spatial layout of parking areas and recognize larger patterns of available parking spaces. Detecting sequences of parking slots can be particularly useful in scenarios where parking slots are organized in rows or designated sections within a parking lot. The ANN may further be trained to identify and classify individual parking slots (the second type of parking slot objects), within the sequences of parking slots, or identifying sequences of parking slots of size one. The ANN may further be trained to determine their occupancy status (vacant, occupied, blocked) based on the information available in the elevated perception maps.

Another technical solution is to dynamically generate elevated perception maps based on real-time data obtained from sensors mounted on the vehicle. In some exemplary embodiments, the location of the vehicle may be determined as a reference point. Subsequently, a pre-existing elevated perception map corresponding to the vehicle's location may be retrieved, encapsulating static infrastructure segments such as roads, lanes, and parking areas. This foundational map may provide a framework upon which real-time sensor data may be overlaid. Through sensors mounted on the vehicle, real-time data about objects in the environment, such as other vehicles, pedestrians, signs, obstacles, or the like, may be continuously collected. Such real-time data may then be integrated into one or more functional layers of the elevated perception map, providing a comprehensive and up-to-date representation of the surroundings area. By combining static infrastructure with dynamic object data, the generated elevated perception map may provide a holistic view of the environment.

One technical effect of utilizing the disclosed subject matter is enhancing the accuracy and precision of parking slot detection systems in autonomous parking applications, especially in urban areas. The disclosed subject matter enables the accurate detection and localization of parking slot objects through the generation of elevated perception maps. By dynamically generating the elevated perception maps based on accurate maps that are dynamically updated based on real-time sensor data obtained from sensors mounted on the vehicle, the system ensures accurate and up-to-date information about the surrounding environment. This robust perception enhances the system's responsiveness and reliability in navigating complex driving scenarios. This adaptive representation enhances the versatility of the system, enabling it to adapt to different driving environments and scenarios.

Another technical effect of utilizing the disclosed subject matter is to provide a general solution for parking with zero prior assumptions. The disclosed solution does not rely on prior assumptions about road markings, parking slot orientation, or size. It directly detects parking slots, making it adaptable to a wide variety of parking lots with different markings or no markings at all. The disclosed subject matter is a single solution that can be seamlessly utilized for all scenarios including paved and non-paved parking areas, without having to identify the specific relevant scenario.

Yet another technical effect of utilizing the disclosed subject matter is providing fine-grained object detection. The disclosed subject matter provides an effective parking area segmentation within elevated perception map. By incorporating functional layers such as a parking area segmentation layer, the system accurately delineates sub-areas where vehicles can park. This segmentation facilitates the precise determination of parking slot locations within designated parking areas, optimizing the parking process for the autonomous driving system. The ANN detects and classifies parking slot objects with different occupancy statuses, such as vacant, blocked, or occupied. This fine-grained object detection enhances the system's ability to discern detailed information about parking slots, enabling precise decision making in autonomous parking maneuvers.

Yet another technical effect of utilizing the disclosed subject matter is to improve adaptability and robustness of parking slot detection systems. The disclosed solution may be used as a stand-alone, end-to-end module, or seamlessly integrated with other perception networks, leveraging their information to enhance the precision of its predictions. While the module exhibits strong performance independently, its ability to interface with supplementary modules becomes particularly advantageous in novel scenarios or when encountering unfamiliar objects. This adaptive quality ensures that the system remains effective and reliable across a wide range of parking environments, contributing to its overall efficacy in autonomous parking applications.

Yet another technical effect of utilizing the disclosed subject matter is to enable automatic parking within unstructured parking areas. In scenarios where parking spaces are not clearly defined or structured, such as open spaces or unconventional parking scenarios, enabling automatic parking poses a challenge. The disclosed subject matter seeks to overcome this challenge by providing a solution capable of facilitating automatic parking even within unstructured parking areas.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a schematic illustration of an exemplary elevated perception map of a surrounding area around a vehicle, in accordance with some exemplary embodiments of the disclosed subject matter.

Map 110a may be an elevated perception map of a surrounding area around a vehicle (represented as Vehicle 100 in Map 110a, in Map 110f and in each of Functional Layers Maps 110b-110e), from an elevated viewpoint, such as from above the vehicle, from the sky, from an airplane, from a drone, or the like. Map 110a may be generated to provide a comprehensive understanding of the surrounding area to aid in various tasks such as navigation, obstacle detection, parking slot detection, or the like. Additionally, or alternatively, Map 110a may be generated from other elevated viewpoint, simulating a bird's-eye view, an angled top-down perspective of the area surrounding the vehicle, from behind the vehicle, or any other perspective that enables a broader understanding of the environment compared to ground-level views.

In some exemplary embodiments, Map 110a may comprise a plurality of functional layers. Each layer of Map 110a may be configured to indicated a different type of element of the surrounding area around the vehicle. Such elements may comprise infrastructure segment elements, such as Roads 120a, Parkable Area 130a, open space area, lanes, paths, crosswalks, or the like. Additionally, or alternatively, the elements may comprise objects, that their location may be dynamic, or may change over time in Map 110a, such as Vehicles 140a, Obstacles 150a, such as signs, obstacles, pedestrians, animals, or the like. Each pixel in Map 110a, at each relative location with respect to Vehicle 100 in Map 110a, may comprise values indicative of infrastructure segments or objects located at corresponding relative locations to the vehicle based on the location of the pixel with respect to the location of Vehicle 100 in Map 110a. Values of pixels at different layers indicate different elements, e.g., respective infrastructure segment or object located at corresponding relative locations to the vehicle.

Referring now to FIGS. 1B-1E showing schematic illustrations of exemplary layers of elevated perception Map 110a, in accordance with some exemplary embodiments of the disclosed subject matter.

Each of Functional Layers 110b, 110c, 110d and 110e represent a different aspect of the environment represented by elevated perception Map 110a. However, Map 110a may comprise additional functional layers and may not be limited to this combination of functional layers. Each of Functional Layers 110b, 110c, 110d and 110e may serve a distinct purpose in understanding the surrounding environment around Vehicle 100. These layers include infrastructure elements such as roads, parking areas, open areas, spaces, lanes, paths, and crosswalks, or objects like vehicles, pedestrians, signs, obstacles, or the like.

In some exemplary embodiments, Map 110a may comprise different segmentation layers, such as Functional Layer 110b and Functional Layer 110c, each of which represents a different type of infrastructure element present in the surrounding area of the vehicle, such as, roads, lanes, crosswalks, pavement markings, bridges, tunnels, parking areas, overpasses, underpasses, or the like. As an example, pixels at Functional Layer 110b associated with Road 120 may represent drivable roadways. As another example, Functional Layer 110c may be a parking area segmentation layer that is indicative of sub-areas, such as Parking Area 130 in the surrounding area around Vehicle 100 in which vehicles can park. A parking slot object detection may be configured to determine locations of parking slot objects within areas that are segmented as Parking Areas 130 according to Functional Layer 110c. A Parking Area 130 in Functional Layer 110c may be subdivided into a plurality of parking slots (see for example, the respective identified parking slot objects in FIG. 1F).

Additionally, or alternatively, Map 110a may comprise different object layers, such as Functional Layer 110d and Functional Layer 110e, each of which represent a different type of object present in the surrounding area of the vehicle, such as obstacles, pedestrians, other vehicles, signs, or the like. These objects are crucial for the vehicle's perception and decision-making processes during navigation.

As an example, Functional Layer 110d may be a vehicle object layer that is indicative of other vehicles that are present in the surrounding area of Vehicle 100, such as Vehicles 140.

In some exemplary embodiments, different vehicle object layers may be deployed for different types of vehicles, such as trucks, motorcycles, or the like, having different properties, such as different physical dimensions, different speeds, properties or the like.

In some exemplary embodiments, Functional Layer 110d, other vehicle object layers, other object layers may be determined based on real-time sensor readings at the surrounding area of the vehicle, such as based on cameras mounted on Vehicle 100, satellite cameras, LiDAR sensors, radar sensors, or other types of sensors capable of capturing information about the surrounding environment.

Additionally, or alternatively, Functional Layer 110d, or any other vehicle object layer, may be determined based on filtration of vehicles that travel at a speed above a predetermined threshold speed, such as above 5 km/h, 10 km/h or the like. Filtering out such vehicles may ensure that the system focuses its attention on vehicles that are more likely to be involved in parking activities. Slower-moving vehicles may be more likely to be searching for parking spots, approaching parking areas, or maneuvering within parking lots. By excluding fast-moving vehicles, the system can prioritize the detection and analysis of vehicles that are relevant to the parking slot occupancy status.

As another example, Pixels at Functional Layer 110e associated with Obstacles 150, represent objects in the area around Vehicle 100 that may be classified as obstacles with respect to Vehicle 100, such as trash cans, roadside barriers, construction equipment, debris, pedestrians, cyclists, animals crossing the road, or the like.

Referring now to FIG. 1F showing a schematic illustration of an exemplary elevated perception map of a surrounding area around a vehicle and markings of detected parking slot objects thereon, in accordance with some exemplary embodiments of the disclosed subject matter.

In some exemplary embodiments, the detected parking slot objects may be marked on a perception elevated Map 110f, as rectangle shapes pointed to by 160, 170 and 180. Map 110f may be similar to Map 110a, and may serve as a comprehensive representation of the environment, and may aid in various tasks such as navigation and parking slot detection.

In some exemplary embodiments, the detected parking slot objects may be distinguished by specific markings on Map 110f, facilitating their identification and utilization by an autonomous driving system installed on Vehicle 100. These markings serve to inform the autonomous driving system about the availability and status of parking slots within the vicinity of the vehicle, enabling it to autonomously maneuver and park the vehicle in a suitable vacant parking slot. Different markings may be utilized to denote different states or occupancy status of the detected parking slot objects. As an example, a vacant parking slot, such as 160, may be marked with a dashed rectangle, indicating areas where parking is available. As another example, a blocked parking slot, such as 170, may be marked with a dotted rectangle, and denote parking slots that are obstructed or blocked by obstacles, such as signs, pedestrians (150a), making them unsuitable for parking. As yet another example, an occupied parking slot, such as 180, may be marked with a bold rectangle, and signify parking slots that are already occupied by vehicles (140a), indicating that these spaces are currently unavailable for parking.

By providing this information to the autonomous driving system, Map 110f enables Vehicle 100 to make informed decisions regarding parking, selecting a vacant parking slot from the detected parking slot objects and maneuvering the vehicle into the designated space autonomously. This integration of perception maps with real-time parking slot detection enhances the efficiency and accuracy of autonomous parking systems, contributing to safer and more reliable vehicle navigation in urban environments.

Referring now to FIG. 2 showing a flowchart diagram of a method, in accordance with some exemplary embodiments of the disclosed subject matter.

On Step 210, an elevated perception map of a surrounding area around a vehicle may be obtained. In some exemplary embodiments, the elevated perception map may be either a top-down view of the surrounding area around the vehicle or a bird's-eye view of the of the surrounding area around the vehicle.

Step 220 describes the generation process of the elevated perception map, which involves obtaining the vehicle's location and a pre-existing elevated perception map at that location. The pre-existing map represents static infrastructure segments, and functional layers are populated with real-time sensor data indicating the existence of objects.

On Step 230, a location of the vehicle may be obtained, serving as a basis for generating the elevated perception map. The location of the vehicle may be obtained through methods such as GPS, onboard sensors, IMUs, wireless communication, by referencing map data, or the like.

On Step 240, a pre-existing elevated perception map at the location of the vehicle may be obtained. The pre-existing elevated perception maps may represent one or more static infrastructure segments at the location of the vehicle, such as drivable roads, parking areas, lane markings, or the like.

On Step 250, one or more functional layers may be populated with data based on real-time sensor reading that is indicative of existence of objects.

In some exemplary embodiments, real-time data about the surrounding environment, may be obtained from sensors of the autonomous vehicle, such as cameras capturing visual information, enabling the detection and classification of objects such as vehicles, pedestrians, signs, static obstacles, or the like. Other sensors, such as LiDAR, Radar, Ultrasonic sensors, Ultrasonic sensors, GPS receivers, or the like, may be utilized to precise detection and localization of objects, measure their velocities, providing information about their positions and movements, measure distance, provide accurate location data, or the like.

The processed data obtained from these sensors may be utilized to update the functional layers of the elevated perception map. Once the sensor data is collected, it is processed and interpreted by the perception system. The processed data may then used to update the functional layers of the elevated perception map. As an example, object detection results may be utilized to update respective object layers, indicating the presence and positions of vehicles, pedestrians, signs, obstacle, or other respective objects. As another example, distance measurements from LiDAR and radar sensors may be used to update the segmentation layer, indicating drivable roads, parking areas, or other infrastructure segments. As yet another example, data from ultrasonic sensors may be utilized to update the parking area segmentation layer, indicating available or occupied parking slot object.

As yet another example, one layer of the functional layers of the elevated perception map may be a vehicle object layer which may be indicative of other vehicles that are present in the surrounding area of the vehicle. Data from cameras and LiDAR sensors populate this layer, indicating the presence and positions of other vehicles in real-time in the surrounding area around the vehicle. In some cases, vehicles that travel at a speed above a predetermined threshold speed, such as above 20 km/h, may be filtered out from the elevated perception map, to help prioritizing relevant objects, reducing processing load, minimizing false alarms and improving resource allocation within the autonomous vehicle system.

On Step 260, an ANN-based object detection model may be utilized to detect potential parking slot objects in the elevated perception map representing the surrounding area around the vehicle. The ANN-based object detection model may be specifically trained for detecting parking slot object from two types: a single parking slot object and a plural parking slot object representing a sequence of one or more parking slots.

An example of an architecture of the ANN-based object model may be CenterNet. CenterNet may be configured to predict a bounding box of the parking slot object and its center point simultaneously, in real-time. CenterNet may be configured to model each parking slot as a single point, the center point of its bounding box, and utilizes key point estimations to find center points and regresses to all other object properties, such as size, location, orientation, pose or the like.

In some exemplary embodiments, the ANN-based object detection model may be configured to output the parking slot objects using heat-maps indicating the confidence of the ANN-based object detection model in identifying parking slot objects. The higher the intensity in a certain pixel of the heat-map, the higher the model's confidence that there is a center of a parking slot in the pixel's location. The intensity of the color in a heat-map indicates the model's confidence level. Higher intensity (brighter color) signifies higher confidence in the detection of a parking slot object, while lower intensity (darker color) suggests lower confidence. The size of the heat-map may correspond to the spatial dimensions of the input elevated perception map. Each pixel in the heat-map corresponds to a specific region in the elevated perception map, and the intensity of that pixel represents the confidence score for the presence of a parking slot object in a respective location in the elevated perception map. As an example the size of the heat-maps 32×32 pixels, 36×32 pixels, 100×120 pixels, or the like. The size of the heat-maps may be determined by the resolution of the elevated perception map at the output layer of the neural network. Additionally, or alternatively, the ANN-based object detection model may be configured to output a matrix that provides information about the orientation of detected parking slot objects. Such information may comprise an angle of the parking slot object with respect to a reference axis, an offset associated with the center localization accuracy, size of the parking slot (e.g., length, width, or the like), or the like. The matrix may be of the same size (dimensions) as the heat-map (H×W). The matrix may include orientation information for each cell where the center of a parking slot object is located (e.g., indicating, in each cell, an orientation of a parking slot object that has a center at the respective cell). The information from the matrix may be used to determine geometric information of the parking slot, such as the angle, width, and height of each detected parking slot object. The geometric information may be crucial for accurately representing the parking slots in the top-down view and assessment of the error in down sampling, to improve the center localization accuracy. It may be noted that the information in each cell of the matrix is applicable to each respective cell of each class-specific heat-map. As an example, assuming the ANN-based object detection model outputting a first detected parking slot object and a second detected parking slot, in the same pixel from different classes, a single angle measurement that may be applicable to both the first detected parking slot object and the second detected parking slot object may be defined. The orientation characteristics of a parking slot object in a specific location, may be set regardless of the class of the parking slot object.

Additionally, or alternatively, the plurality of functional layers of the elevated perception map may comprise a parking area segmentation layer that is indicative of sub-areas in the surrounding area around the vehicle in which vehicles can park. The parking slot object detection may be configured to determine locations of one or more parking slot objects within areas that are segmented as parking areas according to the parking area segmentation layer.

On step 270 ANN may be utilized to detect occupancy status of each parking slot object. The occupancy status may be a vacant parking slot status, e.g., for parking slots that are available for parking by the vehicle. Additionally, or alternatively, the occupancy status may be a blocked parking slot status, e.g., parking slots that are blocked with other objects, parking slots that are unavailable for the vehicle although not being occupied with a parking car, such as due to the presence of a pedestrian, or another obstacle, preventing access to the parking slot, due to a gate preventing access thereto, due to legal constraints or limited access permissions preventing usage thereof by the vehicle of interest, or the like. As can be appreciated, the "blocked" classification may be different for different vehicles, depending on their different access permissions and permits. Additionally, or alternatively, the occupancy status may be an occupied parking status, for parking slots which other vehicles are parking. Additionally, or alternatively, different combinations of occupancy statuses with different definitions may be defined, based on visual characteristics, context, or the like On Step 280, the detected parking slot objects may be outputted. In some exemplary embodiments, the one or more detected parking slot objects may be outputted to an autonomous driving system of the vehicle.

In some exemplary embodiments, each detected parking slot object, may be outputted along with respective orientation, such as parking angle, or the like. Additionally, or alternatively, the parking slot objects and occupancy status thereof within the surrounding area around the vehicle may be displayed to a human driver for autonomous parking applications, on the elevated perception map, or on any other graphical display of parking slots. The graphical display may be in top-down representation generated based or on the top of elevated perception map of the surrounding area around the vehicle. An in-vehicle display (e.g., vehicle's dashboard display, infotainment system, or the like) may be utilized to display the graphical display, providing to the driver real-time information about available parking slots and their characteristics.

On step 290, the output may be utilized by the autonomous driving system or a parking maneuver system of the vehicle to perform autonomous parking. The autonomous driving system may be enabled to autonomously park the vehicle in a vacant parking slot selected from the detected parking slot objects. In some exemplary embodiments, the output may be utilized by an autonomous driver of the vehicle, to park the vehicle in a parking slot without human intervention. The information generated through the detection process serves as input for the autonomous driving system to make decisions on maneuvering and parking the vehicle safely.

Figure 3:
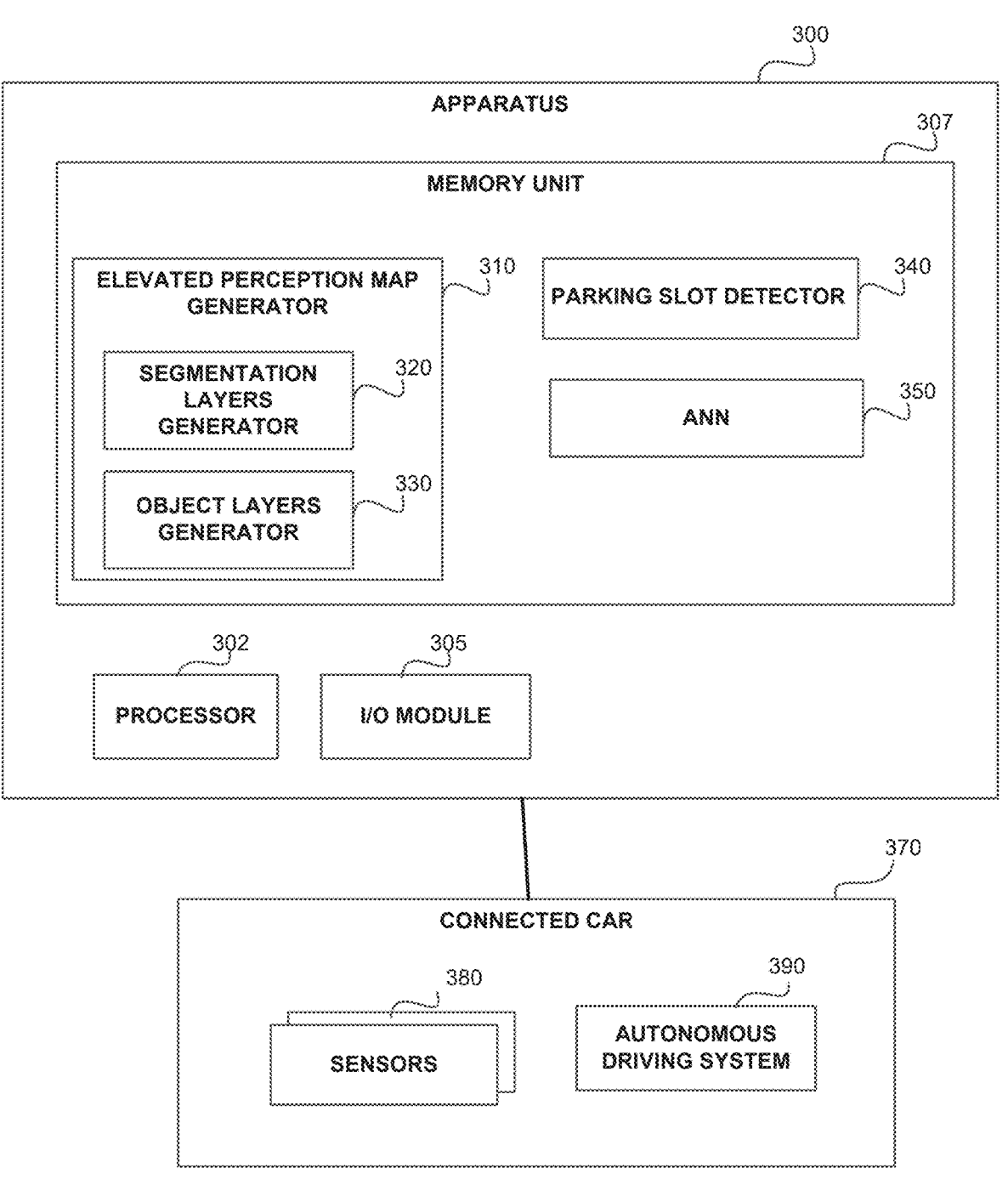
FIG. 3 shows a block diagram of apparatuses, in accordance with some exemplary embodiments of the disclosed subject matter.

Referring now to FIG. 3 showing a block diagram of an apparatus, in accordance with some exemplary embodiments of the disclosed subject matter.

An Apparatus 300 may be configured to support parking slot detection, in accordance with the disclosed subject matter. In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents.

In some exemplary embodiments of the disclosed subject matter, Apparatus 300 may comprise an Input/Output (I/O) module 305. I/O Module 305 may be utilized to provide an output to and receive input from a user, a device, a sensor, a vehicle, or the like, such as, for example receiving an input from one or more Sensors 380 of Connected Car 370, providing output for one or systems of Connected Cars 370, such as Autonomous Driving Systems 390, or the like.

In some exemplary embodiments, Apparatus 300 may comprise Memory 307. Memory 307 may be a hard disk drive, a Flash disk, a Random-Access Memory (RAM), a memory chip, or the like. In some exemplary embodiments, Memory 507 may retain program code operative to cause Processor 302 to perform acts associated with any of the subcomponents of Apparatus 300.

In some exemplary embodiments, Connected Car 370 may comprise one or more Sensors 380, such as geo-location sensors, GPS sensors, cameras, or the like. Sensors 380 may be configured to provide data informative of the location of Connected Car 370, or another vehicle or object associated with Connected Car 370. Additionally, or alternatively, Connected Car 370 may comprise additional sensors, such as a digital camera, a thermal infra-red camera, RGB modeling sensor, LiDAR, a smart camera device, a network of spatially distributed smart camera devices, a sonographer, Magnetic resonance imaging (MRI) sensor, a combination thereof, or the like.

In some exemplary embodiments, Elevated Perception Map Generator 310 may be configured to dynamically generate, based on real-time data obtained from Sensors 380 mounted on Connected Car 370 via I/O Module 305, an elevated perception map of a surrounding area around Connected Car 370. Each pixel in the elevated perception map may be associated with a predetermined relative location to Connected Car 370. The elevated perception map may comprise a plurality of functional layers. The values of pixels at different layers may indicate an infrastructure segment or object located at corresponding relative locations to Connected Car 370. Elevated Perception Map Generator 310 may be configured to obtain a real-time location of Connected Car 370, such as from a location sensor of Sensors 380. Based on the real-time location, Elevated Perception Map Generator 310 may be configured to obtain a pre-existing elevated perception map at the real-time location of Connected Car 370. The pre-existing elevated perception map may be obtained from local databases or storages associated with Apparatus 300 (not shown), Cloud-based sources, collaborative mapping platforms, network-based services, or the like.

In some exemplary embodiments, Segmentation Layers Generator 320 may be configured to utilize the pre-existing elevated perception maps to generate layer representing static infrastructure segments at the location of the vehicle, such as drivable roads, available driving paths, stop lines indications, parking areas, lane markings indication, or the like.

In some exemplary embodiments, Segmentation Layers Generator 320 may be configured to generate a parking area segmentation layer that is indicative of sub-areas in the surrounding area around Connected Car 370 in which vehicles can park. Parking Slot Detector 340 may be configured to determine locations of parking slot objects within areas that are segmented as parking areas according to the parking area segmentation layer by Segmentation Layers Generator 320.

Additionally, or alternatively, Segmentation Layers Generator 320 may be configured to generate a vehicle object layer that is indicative of other vehicles that are present in the surrounding area of Connected Car 370 Parking Slot Detector 340 may be configured to classify parking slots as occupied or vacant based on the other vehicles located in the surrounding area of Connected Car 370.

In some exemplary embodiments, Object Layers Generator 330 may be configured to generate functional layers based on real-time sensor reading from Sensors 380 that are indicative of existence of objects, such as vehicles, pedestrians, signs, speed bumps, obstacles, or the like.

In some exemplary embodiments, Parking Slot Detector 340 may be configured to perform parking slot object detection in the elevated perception map generated by Elevated Perception Map Generator 310. In some exemplary embodiments, Parking Slot Detector 340 may be configured to employ an ANN 350 to perform the detection of the parking slot objects.

In some exemplary embodiments, the ANN 350 may be trained to identify an object representing a sequence of one or more parking slots. Then, the ANN 350 may be configured to identify, within the identified sequences of one or more parking slots, objects of single parking slot objects. ANN 350 may be further configured to detect an occupancy status of each detected parking slot object, a vacant parking slot status, a blocked parking slot status, and an occupied parking status.

The detected parking slot objects may be outputted to Connected Car 370 via I/O Module 305 to be utilized by Autonomous Driving System 390 to autonomously park the vehicle in a vacant parking slot that is selected from the detected parking slot objects.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for parking slot detection, the method comprising:

obtaining an elevated perception map of a surrounding area around a vehicle, each pixel in the elevated perception map is associated with a predetermined relative location to the vehicle, wherein the elevated perception map comprises a plurality of functional layers, wherein values of pixels at different layers indicate an infrastructure segment or object located at corresponding relative locations to the vehicle;

performing parking slot object detection in the elevated perception map, wherein the parking slot object detection is performed using an Artificial Neural Network (ANN), whereby obtaining one or more detected parking slot objects, wherein the plurality of functional layers of the elevated perception map comprises a vehicle object layer that is indicative of other vehicles that are present in the surrounding area of the vehicle, whereby the parking slot object detection is configured to classify parking slots as occupied or vacant based on the other vehicles, wherein the vehicle object layer is determined based on real-time sensor readings at the surrounding area of the vehicle, wherein the vehicle object layer is determined based on a filtration of vehicles that travel at a speed above a predetermined threshold speed; and outputting the one or more detected parking slot objects.

2. The method of claim 1, wherein said outputting comprises providing the one or more detected parking slot objects to an autonomous driving system of the vehicle, whereby the autonomous driving system is enabled to autonomously park the vehicle in a vacant parking slot that is selected from the one or more detected parking slot objects.

3. The method of claim 1, wherein the elevated perception map is at least one of:

a top-down view of the surrounding area around the vehicle, and a bird's-eye view having a perspective view of the surrounding area around the vehicle.

4. The method of claim 1, wherein the plurality of functional layers of the elevated perception map comprises a parking area segmentation layer that is indicative of sub-areas in the surrounding area around the vehicle in which vehicles can park, whereby the parking slot object detection is configured to determine locations of one or more parking slot objects within areas that are segmented as parking areas according to the parking area segmentation layer.

5. The method of claim 4, wherein a parking blob indicated in the parking area segmentation layer is subdivided into a plurality of parking slots.

6. The method of claim 1, wherein the plurality of functional layers of the elevated perception map comprises: at least one segmentation layer and at least one object layer, wherein an individual segmentation layer of the at least one segmentation layer represents an infrastructure segment, whereby a value of the individual segmentation layer at a pixel is indicative of whether a respective corresponding location to the pixel is associated with the infrastructure segment, wherein an individual object layer of the at least one object layer represents an object type, whereby a value of the individual object layer at the pixel is indicative of whether the respective corresponding location to the pixel is occupied by an object of the object type.

7. The method of claim 1, wherein values of pixels at different layers of the plurality of functional layers of the elevated perception map are indicative of infrastructure segments selected from the group of:

a drivable road;

an available driving path;

a stop line indication;

a parking area; and a lane markings indication.

8. The method of claim 1, wherein values of pixels at different layers of the plurality of functional layers of the elevated perception map are indicative of objects selected from the group of:

a vehicle;

a pedestrian;

a sign;

a speed bump indication; and a static obstacle.

9. The method of claim 1, wherein the elevated perception map is generated dynamically based on real-time data obtained from one or more sensors that are mounted on the vehicle.

10. The method of claim 1, wherein the elevated perception map is generated by:

obtaining location of the vehicle;

obtained a pre-existing elevated perception map at the location of the vehicle, the pre-existing elevated perception maps represents one or more static infrastructure segments at the location of the vehicle; and populating one or more functional layers with data based on real-time sensor reading that is indicative of existence of objects.

11. The method of claim 1, wherein the ANN is further configured to detect an occupancy status of each detected parking slot object, wherein the plurality of parking slot objects comprises at least two parking objects, having different occupancy statuses selected from the group of: a vacant parking slot status, a blocked parking slot status, and an occupied parking status.

12. The method of claim 1, wherein the ANN is trained to identify a first object type and a second object type, the first object type is a single parking slot object, the second object type is an object representing a sequence of one or more parking slots.

13. A computerized apparatus having a hardware processor, the processor the hardware processor being coupled to a memory, being hardware processor adapted to perform the steps of:

obtaining an elevated perception map of a surrounding area around a vehicle, each pixel in the elevated perception map is associated with a predetermined relative location to the vehicle, wherein the elevated perception map comprises a plurality of functional layers, wherein values of pixels at different layers indicate an infrastructure segment or object located at corresponding relative locations to the vehicle;

performing parking slot object detection in the elevated perception map, wherein the parking slot object detection is performed using an Artificial Neural Network (ANN), whereby obtaining one or more detected parking slot objects, wherein the plurality of functional layers of the elevated perception map comprises a vehicle object layer that is indicative of other vehicles that are present in the surrounding area of the vehicle, whereby the parking slot object detection is configured to classify parking slots as occupied or vacant based on the other vehicles, wherein the vehicle object layer is determined based on real-time sensor readings at the surrounding area of the vehicle, wherein the vehicle object layer is determined based on a filtration of vehicles that travel at a speed above a predetermined threshold speed; and outputting the one or more detected parking slot objects.

14. A computer program product comprising a non-transitory computer readable storage medium retaining program instructions, which program instructions when read by a processor, cause the processor to perform a method comprising:

obtaining an elevated perception map of a surrounding area around a vehicle, each pixel in the elevated perception map is associated with a predetermined relative location to the vehicle, wherein the elevated perception map comprises a plurality of functional layers, wherein values of pixels at different layers indicate an infrastructure segment or object located at corresponding relative locations to the vehicle;

performing parking slot object detection in the elevated perception map, wherein the parking slot object detection is performed using an Artificial Neural Network (ANN), whereby obtaining one or more detected parking slot objects, wherein the plurality of functional layers of the elevated perception map comprises a vehicle object layer that is indicative of other vehicles that are present in the surrounding area of the vehicle, whereby the parking slot object detection is configured to classify parking slots as occupied or vacant based on the other vehicles, wherein the vehicle object layer is determined based on real-time sensor readings at the surrounding area of the vehicle, wherein the vehicle object layer is determined based on a filtration of vehicles that travel at a speed above a predetermined threshold speed; and outputting the one or more detected parking slot objects.

* * * * *